Patented Mar. 31, 1942

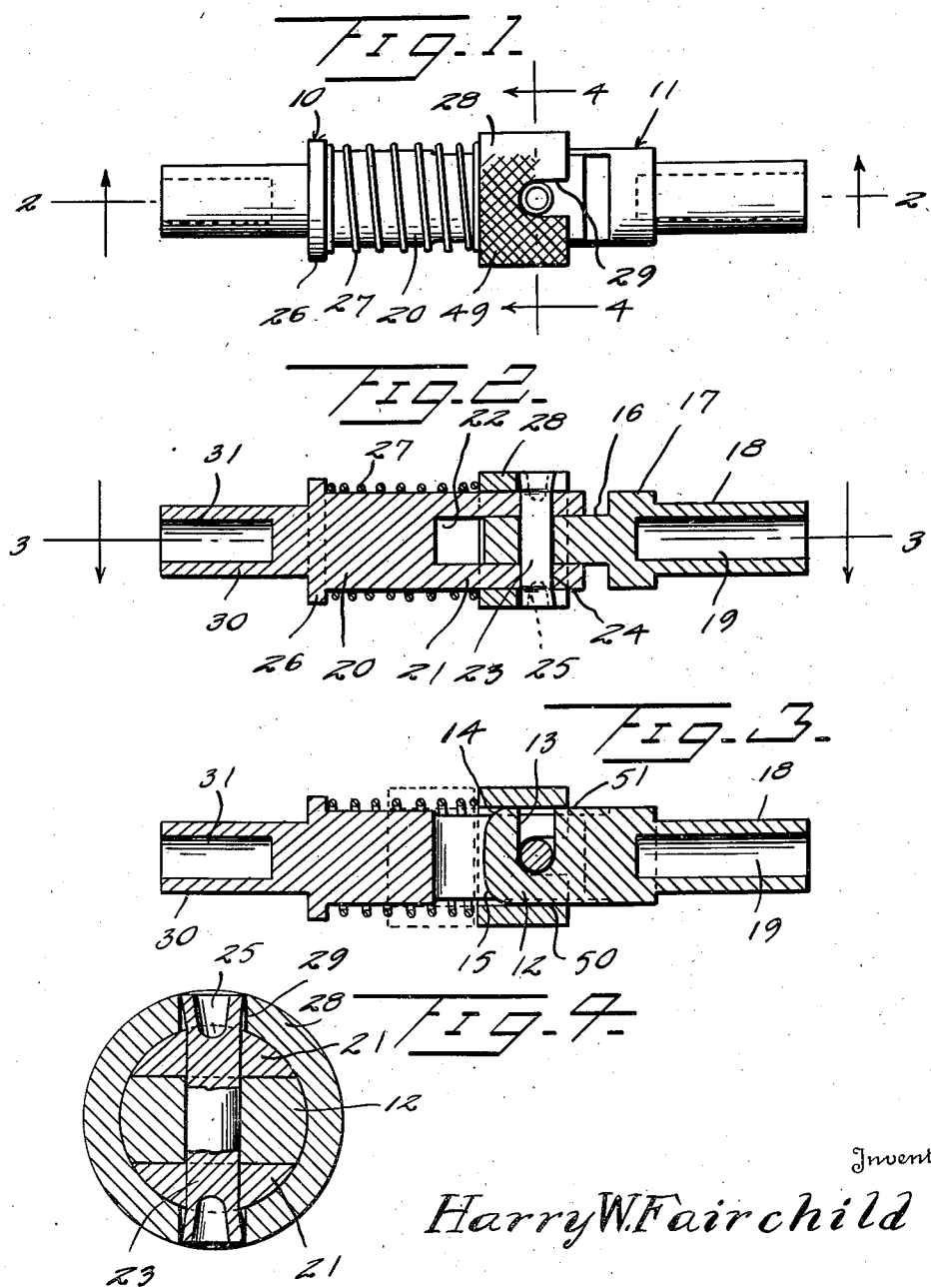

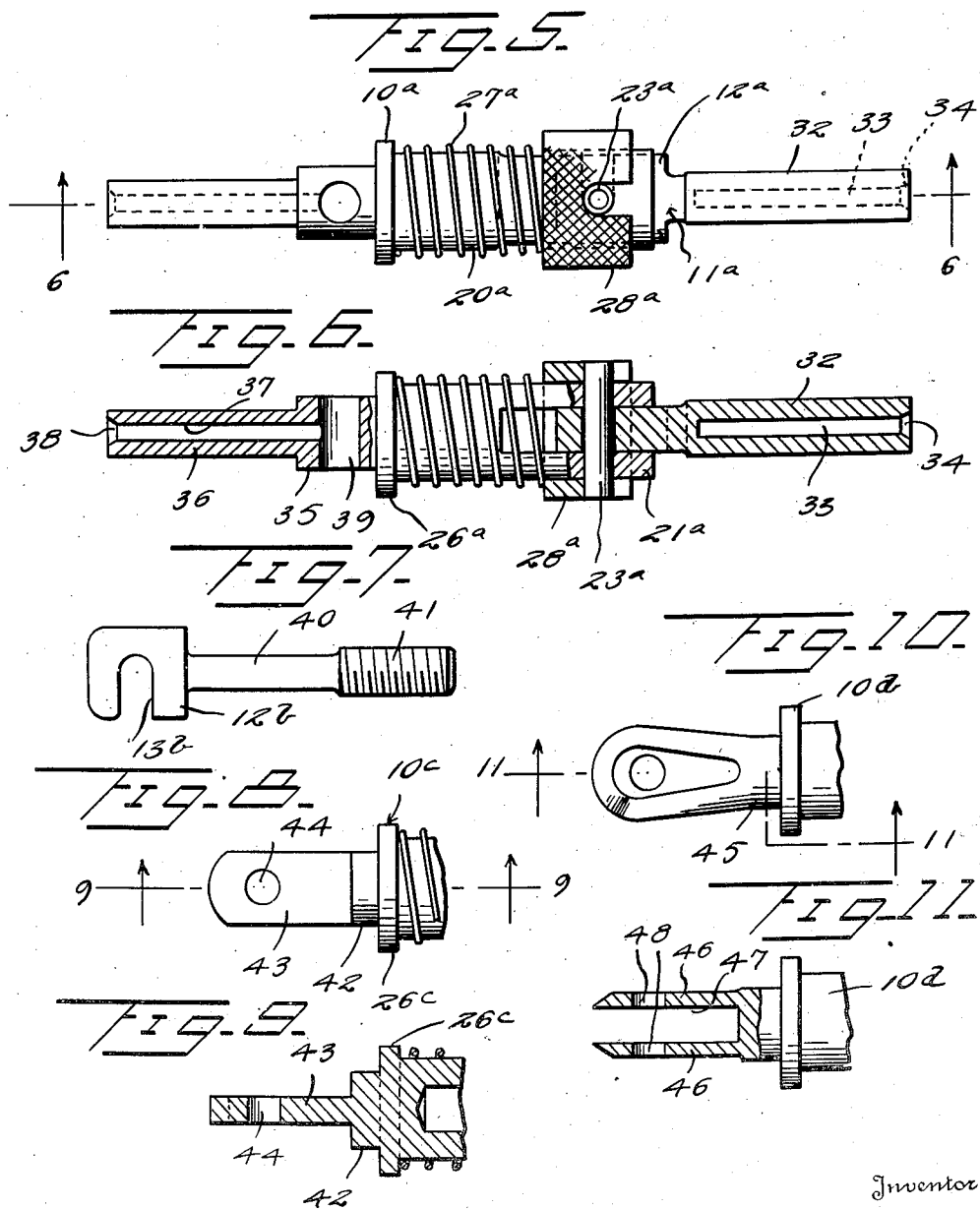

2,278,308

UNITED STATES PATENT OFFICE 2,278,308

QUICK DETACHABLE COUPLING OR FITTING

Harry W. Fairchild, Corry, Pa., assignor to Aero Supply Mfg. Co. Inc., Corry, Pa.

Application December 11, 1941, Serial No. 422,577

8 Claims. (Cl. 287—104)

This invention relates to a quick detachable fitting or connector for rods, tubes, cables or the like.

An object of this invention is to provide a detachable fitting or connector for rods, tubes, cables or like elements which is so constructed that the ends of the elements will be firmly locked together but may be easily and quickly separated.

Another object of this invention is to provide a fitting or connector of this kind which may be used to provide a quick means for connecting or disconnecting portions of an airplane engine to the controls or other parts of the plane.

A further object of this invention is to provide a fitting or connector of this kind for coupling rods, tubes, cables or other movable or immovable elements together which includes a spring-pressed locking sleeve for normally holding the connector or fitting parts in locked or coupling position.

To the foregoing objects and others which may hereinafter appear, the invention consists of the novel construction, combination and arrangement of parts as will be more specifically referred to and illustrated in the accompanying drawings, but it is to be understood that changes, variations and modifications may be resorted to which fall within the scope of the invention as claimed.

In the drawings:

Figure 1 is a detail side elevation of a fitting or connector constructed according to an embodiment of this invention, Figure 2 is a sectional view taken on the line 2—2 of Figure 1, Figure 3 is a sectional view taken on the line 3—3 of Figure 2, Figure 4 is a sectional view taken on the line 4—4 of Figure 1, Figure 5 is a detail side elevation of a modified form of connector fitting, Figure 6 is a sectional view taken on the line 6—6 of Figure 5, Figure 7 is a detail side elevation of a modified form of clevis or coupling hook, Figure 8 is a further modification of a cable attaching part associated with this invention, Figure 9 is a sectional view taken on the line 9—9 of Figure 8, Figure 10 is a fragmentary elevation of a further modification of this connector, and Figure 11 is a sectional view taken on the line 11—11 of Figure 10.

Referring to the drawings, the numerals 10 and 11 designate generally a pair of connector or fitting parts which are adapted to be connected to the ends of a pair of push-pull tubes, rods or other elements. The connector part 11 comprises a hook or clevis 12 which is formed with a laterally opening slot 13. The inner end of the clevis or hook 12 is formed with rounded end portions 14 and 15 to facilitate the insertion or removal of the clevis 12 from the coupling part 10.

The clevis 12 includes a flat shank 16 and a cylindrical or rounded base or hub 17. An elongated axially disposed shank 18 extends from the base or hub 17 and is provided with an axially disposed cylindrical socket 19 for lightening the shank 18. A tube or the like is adapted to telescope over the shank 18 and abut against the base 17, being secured on the shank 18 by welding, brazing, pinning or other suitable fastening means.

The coupling part 10 comprises a shank 20 which is formed at its inner end with a pair of spaced apart arms 21 having the space 22 therebetween a distance sufficient to readily admit the insertion of the clevis 12 therebetween. A transversely disposed coupling pin 23 is extended through the openings 24 which are formed in the bifurcated arms 21, and this pin 23 is formed in the opposite ends thereof with axially disposed recesses 25, so that the outer projecting ends of the coupling pin 23 may be outwardly distorted or spread in order to provide for the holding of the pin 23 against endwise movement with respect to the arms 21.

The shank or coupling body 20 at its outer end portion is provided with an outer flange or rib 26, and an expansible spring 27 is loosely disposed about the shank or body 20 and at one end engages against the inner side of the flange or rib 26. A cylindrical locking sleeve 28 is slidably mounted on the shank or coupling body 20, and the inner end of the spring 27 bears against the outer end of the sleeve 28 so as to constantly urge the sleeve 28 in the direction of the coupling pin 23. The sleeve 28 is provided with a pair of diametrically disposed and inwardly opening slots 29 within which the outer projecting end portions of the coupling pin 23 are adapted to loosely engage. When the sleeve 28 is in a locking position for locking the clevis 12 in the coupling member 10, the sleeve 28 will be disposed in its innermost position with the opposite ends of the locking pin 23 engaged in the diametric slots 29 as shown in Figures 1 and 2. In this locking position, the locking sleeve 28 encompasses the inner end portions of the arms 21 and also encompasses the clevis 12.

The coupling member 10 is provided with an axially disposed reduced diameter stem or shank 30 and the shank or stem 30 is formed with an axially disposed socket 31 for reducing the weight of the connector, and a tube or other element is adapted to telescope over the shank 30 and to be secured thereon by any suitable fastening means.

Referring now to Figures 5 and 6, there is shown a connector which is similar in every detail to the connector shown in Figures 1 to 4 inclusive, with the exception of the attaching means at the opposite ends of the connector parts. The connector shown in Figures 5 and 6 includes a coupling member 10a similar in every detail to the coupling member 10, and a coupling or connector member 11a similar to the coupling member 11 with the exceptions hereinafter described.

A clevis locking sleeve 28a is slidable on the shank or body 20a, being constantly urged to a locking position by means of an expansible spring 27a. A clevis engaging or locking pin 23a is extended through the arms 21a of the shank 20a and is formed in every detail similar to the pin 23a. The clevis 12a is similar to the clevis 12, but has formed integral with the outer end thereof an elongated cylindrical shank or stem 32 which is formed with an axially disposed socket 33. The outer end of the cylindrical socket 33 is flared as at 34 so as to facilitate the insertion of a wire or small cable into the socket 33. The outer end of the shank or stem 32 may, if desired, be compressed so as to tightly clamp the wire or cable within the socket 33, or if desired, any other suitable fastening means may be provided for firmly holding the wire, cable or the like within the socket 33.

The coupling body 20a is formed at its outer end with a cylindrical body 35 of less diameter than the diameter of the body 20a, and a further reduced diameter stem or shank 36 extends axially outwardly from the body 35. The shank 36 is formed with an axial bore 37 which is flared as at 38 at its outer end. The body 35 is provided with a transversely disposed cylindrical opening 39 outwardly from the flange 26a of the coupling body 20a, so that a wire or cable may be extended through the bore 37 into the opening 39, and then pulled through one end of the opening 39 and wound about the body 35. If desired, however, the inner end of the wire or cable may be bent at right angles to the bore 37 within the opening 39 and then welded, soldered or otherwise secured within the bore 37 and/or the opening 39.

In Figure 7, there is disclosed a further modification of a clevis structure wherein a clevis 12b is disclosed similar to the clevis 12 having a laterally extending slot 13b therein. A round shank 40 is formed integral with the clevis 12b, and a threaded stem 41 is disposed axially of the stem 40, and is preferably of a larger diameter than the diameter of the stem or shank 40. The threaded stem 41 is adapted to receive a threaded coupling sleeve which may be connected with a rod, tube, cable or other element which is adapted to be fixed relative to the clevis 12b.

In Figures 8 and 9, there is disclosed a further modified form of this invention wherein the coupling member 10c, which is similar in every detail to the coupling member 10, is provided with a reduced diameter shank 42 extending from the flange or abutment 26c. A flat stem 43 is formed integral with the shank 42 and extends outwardly therefrom, being provided with an opening 44 for receiving a locking pin or the like.

In Figures 10 and 11, there is also disclosed a further modification of the coupling member 10 wherein the coupling member 10d, which is similar to the coupling member, is provided with an outwardly extending shank 45. The shank 45 has formed integral therewith a pair of spaced coupling arms 46 forming a space 47 therebetween within which a connector element similar to the connector element 43 may be received. The spaced arms 46 are provided with axially aligned openings 48 for receiving a coupling pin of conventional construction.

In the use and operation of this detachable connector or fitting, the two connector or coupling parts 10 and 11 are adapted to be fixedly secured at their outer ends to the desired rods, tubes, cables, wire or other elements to be connected together, these elements being fixedly secured in any suitable manner to the respective coupling members. The two connector parts 10 and 11 may be coupled together by moving the sleeve 28 outwardly in the direction of the flange 26 against the tension of the spring 28.

The clevis 12 may then be inserted in the space 22 between the arms 21 and engage with the holding or locking pin 23. Preferably, the outer surface of the sleeve 28 is knurled as at 49 so as to facilitate the ready movement of the sleeve 28 on the shank 20. When the sleeve 28 is released, the spring 27 will automatically move the sleeve 28 inwardly to a locking position, in which position the outer ends of the locking pin 23 will be received within the diametrically opposed slots 29. Preferably, the clevis 12 is formed with straight opposite sides 50 and 51, so that when the clevis 12 is in a coupling position, the clevis will be firmly held by means of the locking sleeve 28 against lateral movement with respect to the coupling member 10.

What is claimed is:

1. A connector comprising a pair of separable members, one of said members comprising a clevis, coupling means carried by said clevis, the other of said members comprising a cylindrical body, a pair of spaced apart arms integral with and extending from an end of said body, a pin extending between said arms and also extending laterally thereof, an annular flange on said body, a cylindrical locking sleeve slidable on said body and said arms, said sleeve having a pair of diametrically disposed slots in which the lateral extensions of said pin are engageable, a spring between said flange and said sleeve for normally urging said sleeve to locking position, and coupling means carried by said body and extending from the latter oppositely from said arms.

2. A connector comprising a pair of separable members, one of said members comprising a clevis formed with parallel opposite edges and a slot opening through one of said edges, coupling means carried by and extending from said clevis, the other of said members comprising a cylindrical body, a pair of spaced apart arms integral with and extending from an end of said body, a pin extending between said arms and also extending laterally thereof, an annular flange on said body at the opposite end thereof, a cylindrical locking sleeve slidable on said body and said arms, said sleeve having a pair of diametrically opposed slots in which the lateral extensions of said pins are engageable, a spring between said flange and said sleeve for normally urging said sleeve to a locking position, and coupling means carried by said body and extending from the latter oppositely from the arms, said sleeve when in locking position encompassing said clevis and maintaining said clevis with the coupling means carried thereby in axial alignment with said body.

3. A connector comprising a pair of separable members, one of said members comprising a clevis provided with parallel opposite edges and a slot opening through one of said edges, a coupling shank carried by and extending from said clevis, the other of said members comprising a cylindrical body, a pair of spaced apart arms integral with and extending from an end of said body, said clevis being loosely engageable between said arms, said clevis having a width substantially equal to the diameter of said body, a pin extending between said arms and also extending laterally thereof, said clevis engageable with said pin, an annular flange on the opposite end of said body, a cylindrical locking sleeve slidable on said body and said arms, said sleeve having a pair of diametrically opposed slots in which the lateral extensions of said pin are engageable, a spring between said flange and said sleeve for normally urging said sleeve to a locking position, and a coupling member carried by said body and extending from the latter oppositely from the arms, said sleeve when disposed in locking position encompassing said arms and said clevis and maintaining said clevis in axial alignment with the axis of said body.

4. A connector comprising a pair of separable members, one of said members comprising a clevis having parallel opposite edges and a slot opening through one of said edges, a threaded coupling means carried by said clevis, the other of said members comprising a cylindrical body, a pair of spaced apart arms integral with and extending from an end of said body, a pin extending between said arms and also extending laterally thereof, said clevis extending loosely between said arms and engaging said pin, an annular flange on said body opposite from said arms, a cylindrical locking sleeve slidable on said body and said arms, said sleeve having a pair of diametrically opposed slots in which the lateral extensions of said pin are engageable, a spring between said flange and said sleeve for normally urging said sleeve to locking position, and a coupling shank carried by said body and extending from the latter oppositely from said arms.

5. A connector comprising a pair of separable members, one of said members comprising a clevis having parallel opposite side edges, a slot opening through one of said edges, coupling means carried by said clevis, the other of said members comprising a cylindrical body, an annular flange on said body, a pair of spaced apart arms integral with and extending from an end of said body, a pin extending between said arms and also extending laterally thereof, said lateral extensions having an inwardly extending recess therein whereby said extensions may be expanded to maintain said pin against endwise movement relative to said arms, said clevis loosely engageable between said arms and about said pin, a cylindrical locking sleeve slidable on said body and said arms, said sleeve having a pair of diametrically opposed slots in which the lateral extensions of said pin are engageable, a spring between said flange and said sleeve for normally urging said sleeve to locking position, and coupling means carried by said body and extending from the latter oppositely from said arms.

6. A connector comprising a pair of separable members, one of said members comprising a clevis having parallel opposite side edges, a slot opening through one of said edges, coupling means carried by said clevis, the other of said members comprising a cylindrical body, an annular flange on said body, a pair of spaced apart arms integral with and extending from an end of said body, a pin extending between said arms and also extending laterally thereof, said lateral extensions having an inwardly extending recess therein whereby said extensions may be expanded to maintain said pin against endwise movement relative to said arms, said clevis loosely engageable between said arms and about said pin, a cylindrical locking sleeve slidable on said body and said arms, said sleeve having a pair of diametrically opposed slots in which the lateral extensions of said pin are engageable, a spring between said flange and said sleeve for normally urging said sleeve to locking position, and a pair of spaced apart coupling arms extending from said body oppositely from said first named arms and formed with aligned openings therethrough.

7. A connector comprising a pair of separable members, one of said members comprising a clevis having parallel opposite side edges, a slot opening through one of said edges, coupling means carried by said clevis, the other of said members comprising a cylindrical body, an annular flange on said body, a pair of spaced apart arms integral with and extending from an end of said body, a pin extending between said arms and also extending laterally thereof, said lateral extensions having an inwardly extending recess therein whereby said extensions may be expanded to maintain said pin against endwise movement relative to said arms, said clevis loosely engageable between said arms and about said pin, a cylindrical locking sleeve slidable on said body and said arms, said sleeve having a pair of diametrically opposed slots in which the lateral extensions of said pin are engageable, a spring between said flange and said sleeve for normally urging said sleeve to locking position, and a flat coupling member integral with and extending from said body oppositely from said arms, said coupling member being formed with an opening therethrough.

8. A connector comprising a pair of separable members, one of said members comprising a clevis having parallel opposite side edges, a slot opening through one of said edges, coupling means carried by said clevis, the other of said members comprising a cylindrical body, an annular flange on said body, a pair of spaced apart arms integral with and extending from an end of said body, a pin extending between said arms and also extending laterally thereof, said lateral extensions having an inwardly extending recess therein whereby said extensions may be expanded to maintain said pin against endwise movement relative to said arms, said clevis loosely engageable between said arms and about said pin, a cylindrical locking sleeve slidable on said body and said arms, said sleeve having a pair of diametrically opposed slots in which the lateral extensions of said pin are engageable, a spring between said flange and said sleeve for normally urging said sleeve to locking position, and a coupling shank carried by and extending from said body oppositely from said arms, said shank having an enlarged inner end portion formed with a transversely disposed opening therethrough, and a reduced outer shank portion formed with an axial bore communicating with said opening.

HARRY W. FAIRCHILD.